(12) United States Patent
Yu et al.

(10) Patent No.: US 7,318,695 B2
(45) Date of Patent: Jan. 15, 2008

(54) COVER FOR A TIE-DOWN ANCHOR

(75) Inventors: Li Yu, Guangzhou (CN); Jingyuan Gan, Shunde (CN); Jeffrey A. Raymond, Leominster, MA (US); Chiu Yan Wan, New Territories (HK)

(73) Assignee: Avery Dennison Corporation, Pasadena, CA (US)

( * ) Notice: Subject to any disclaimer, the term of this patent is extended or adjusted under 35 U.S.C. 154(b) by 88 days.

(21) Appl. No.: 11/219,517

(22) Filed: Sep. 2, 2005

(65) Prior Publication Data

US 2006/0051177 A1 Mar. 9, 2006

Related U.S. Application Data

(60) Provisional application No. 60/607,222, filed on Sep. 2, 2004.

(51) Int. Cl.
*B61D 45/00* (2006.01)
(52) U.S. Cl. ..................................... 410/105
(58) Field of Classification Search ............... 410/105, 410/104, 101, 96, 106, 108, 115
See application file for complete search history.

(56) References Cited

U.S. PATENT DOCUMENTS

| | | | |
|---|---|---|---|
| 4,020,770 A | | 5/1977 | McLennan |
| 4,047,689 A | * | 9/1977 | Grendahl .................. 410/105 |
| 4,062,298 A | * | 12/1977 | Weik ........................ 410/105 |
| 4,109,891 A | * | 8/1978 | Grendahl ................ 248/503.1 |
| 4,230,432 A | * | 10/1980 | Howell ..................... 410/102 |
| 4,496,271 A | * | 1/1985 | Spinosa et al. ............. 410/105 |
| 4,771,969 A | * | 9/1988 | Dowd ....................... 244/118.6 |

(Continued)

FOREIGN PATENT DOCUMENTS

EP 0 900 727 B1 12/2003

*Primary Examiner*—H Gutman
(74) *Attorney, Agent, or Firm*—Kriegsman & Kriegsman

(57) ABSTRACT

A cover for use with a tie-down anchor mounted in a locking track in an air pallet, the locking track having a channel which includes spaced upper flanges shaped to define a series of spaced apart enlarged openings separated by relatively smaller slot segments and the tie-down anchor having a pair of fixed locking studs and a movable spring-loaded locking stud. The cover comprises in one embodiment a first piece and a second piece. The first piece has a front portion sized and shaped to fit into one of the enlarged openings in the locking track and a rear portion sized and shaped to fit over the spring loaded locking stud. The first piece includes a pair of male locking parts. The second piece has a pair of studs sized and shaped to fit into two pairs of enlarged openings but not small enough to move vertically upward through the space defined by a pair of slot segments in the locking track and also includes a pair of female locking parts. When the locking parts in the two pieces are coupled together in place over the tie-down anchor, the first piece covers and prevents access to the spring loaded stud and the second piece prevents lifting up the first piece. In another embodiment, the cover includes a shroud on one piece which cooperates with a pair of wings on the other piece to prevent access to the coupling parts. In another embodiment, the cover is a unitary structure which snap-locks into place over the movable spring-loaded locking stud and the locking track.

4 Claims, 10 Drawing Sheets

U.S. PATENT DOCUMENTS

| | | |
|---|---|---|
| 4,850,769 A | 7/1989 | Matthews |
| 4,932,816 A * | 6/1990 | Ligensa ............... 410/105 |
| 5,609,452 A * | 3/1997 | Looker et al. ............ 410/105 |
| 5,625,926 A | 5/1997 | Berrezouga |
| 5,765,978 A | 6/1998 | Looker et al. |
| 6,715,974 B2 * | 4/2004 | Stotzer et al. ............ 410/105 |
| 6,918,722 B1 * | 7/2005 | Girardin ............... 410/105 |
| 2007/0065248 A1 * | 3/2007 | Legeay ............... 410/105 |

* cited by examiner

COVER FOR A TIE-DOWN ANCHOR

CROSS-REFERENCE TO RELATED APPLICATIONS

The present application claims the benefit under 35 U.S.C. 119(e) of U.S. provisional Patent Application Ser. No. 60/607,222, filed Sep. 2, 2004, the disclosure of which is incorporated herein by reference.

BACKGROUND OF THE INVENTION

The present invention relates generally to a tie-down anchor for use in securing cargo to a track in an air pallet, the tie-down anchor having two fixed studs and one movable spring-loaded stud, the movable spring-loaded stud being used to lock the tie-down anchor onto the track, and more particularly to a cover for use with such an anchor for preventing unauthorized access to the spring-loaded stud when the anchor is locked into the track of an air pallet in order to unlock the anchor from the track.

When small packaged goods are shipped from one location, such as the Far East, to another location, such as the United States, the goods are often piled onto an air pallet, covered with a net and then tied down to the air pallet using cables and tie-down anchors. The tie-down anchors are slidably mounted in a channel in a locking track on the periphery of the air pallet and serve to hold the cables in place over the net. In one well known locking track, the channel has spaced upper flanges shaped to define a series of enlarged spaced apart circular openings separated by relatively narrower track slot segments.

One known type of tie-down anchor often used with the above described locking track includes a main body portion having an opening through which a cable or rope or ring may be inserted, a pair of fixed locking studs and one movable spring-loaded locking stud. When the anchor is locked in place on the locking track, the spring-loaded locking stud sits in one of the enlarged circular openings in the channel and the two fixed studs are underneath a pair of slot segments. The spring-loaded stud must be lifted up above the enlarged circular opening in which it is seated in order to slidably move the anchor along the channel to another location or to remove the tie-down anchor from the locking track.

The problem with these tie-down anchors is that while the goods are in route, an unauthorized person can lift up the spring loaded locking stud from the enlarged circular opening in which it is seated, slide the tie-down anchor down the channel to another location where the cable is not as tight, lift up the net at that location, remove one or more of the packaged goods and then move the tie-down anchor back to where the cable is once again tightly in place over the goods.

SUMMARY OF THE INVENTION

It is a general object of this invention to provide a cover for use with a tie-down anchor of the type having two fixed locking studs and one movable spring-loaded locking stud, the cover preventing unauthorized access to the spring-loaded locking stud when the tie-down anchor is locked into a channel in a locking track in an air pallet.

It is another object of this invention to provide a cover as described above which has a minimum number of parts and which can be easily mounted on or removed from the tie down anchor when so desired.

It is still another object of this invention to provide a cover as described above which if tampered with can be easily detected.

There is provided according to this invention a cover for use with a tie-down anchor having two fixed studs and one movable spring-loaded locking stud for preventing access to the spring loaded locking stud when the tie-down anchor is locked into a locking track in an air pallet, the locking track having a series of regularly spaced apart enlarged openings along its length separated by relatively narrower track slot segments, the cover comprising in one embodiment a first piece and a second piece. Both pieces are made of a sturdy plastic and include locking parts which mate together.

The first piece of the cover has a front portion sized and shaped to fit into in one of the enlarged openings in the channel and a rear portion sized and shaped to fit at the same time over at least the spring-loaded locking stud in the tie-down anchor. The second piece of the cover has a pair of spaced apart studs sized and shaped to fit into two enlarged openings in the channel and can be slidably moved along the channel so that the two spaced apart studs are underneath two relatively narrower track slot segments in the channel.

The first piece of the cover also includes a pair of male locking parts and the second piece of the cover also includes a pair of female locking parts. The two female locking parts are sized and shaped to mate with and lock onto the pair of male locking parts when the two pairs of locking parts are pushed together. Once locked together the locking parts can only be separated from each other by being broken apart. The two pieces are sized relative to the size of the channel so that when the first piece is mounted onto the anchor with the spring loaded stud in one of the enlarged openings and the male and female locking parts on the first and second pieces are locked together, the studs on the second piece are underneath two track slot segments on the channel.

When the tie-down anchor is locked to the channel in the locking track and the cover is mounted on the tie-down anchor with the three studs positioned as described above and two locking parts locked together, the first piece of the cover prevents a person from accessing the spring-loaded member in order to lift up the spring loaded member and then slidably move the anchor along the channel to a different location while the second piece prevents a person from lifting up the first piece from the channel. Once the two pieces are locked together in place, they cannot be separated from each other without actually breaking the pairs of locking parts. The mechanism for locking the two pieces together is similar to the locking mechanism disclosed in U.S. Pat. No. 6,640,394, which patent is incorporated herein by reference.

In another embodiment of the invention, the cover comprises two pieces of a sturdy plastic as in the previously described embodiment, but includes, in addition, a shroud on the first piece and a pair of wings on the second piece. The shroud and wings cooperate to prevent a person from even accessing the mating locking parts so that they can be broken apart. The shroud includes a breakaway section which when broken off enables a person to wedge a screwdriver or other similar tool between the two pieces of the cover and then indirectly break the pairs of locking parts in order to separate the second piece from the third piece.

In another embodiment of the invention, the cover comprises a single piece of a sturdy plastic which is sized and shaped to fit over the spring-loaded locking stud and also fit into one of the enlarged openings in the channel. The cover also includes a pair of outer legs on either side of a pair of flexible inner legs, the inner legs having feet. The cover is mounted over the spring-loaded locking stud in the tie-down anchor and onto the locking track by positioning the cover over the anchor and the enlarged circular opening then pushing the cover down such that the inner legs flex in and feet on the pair of inner legs snap lock underneath a pair of relatively narrower track slot segments. The sole purpose of the outer legs, which are not connected in any way to the inner legs is to prevent a person from access by the inner legs. The only way the cover can be removed from the anchor once it is mounted thereon is to break off the outer pair of legs so that one can access the inner legs, then squeeze the inner pair of legs toward each other so that they are not locked onto track segments and then lift the cover up vertically from the anchor and track.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

DETAILED DESCRIPTION OF PREFERRED EMBODIMENTS

Figure 1:
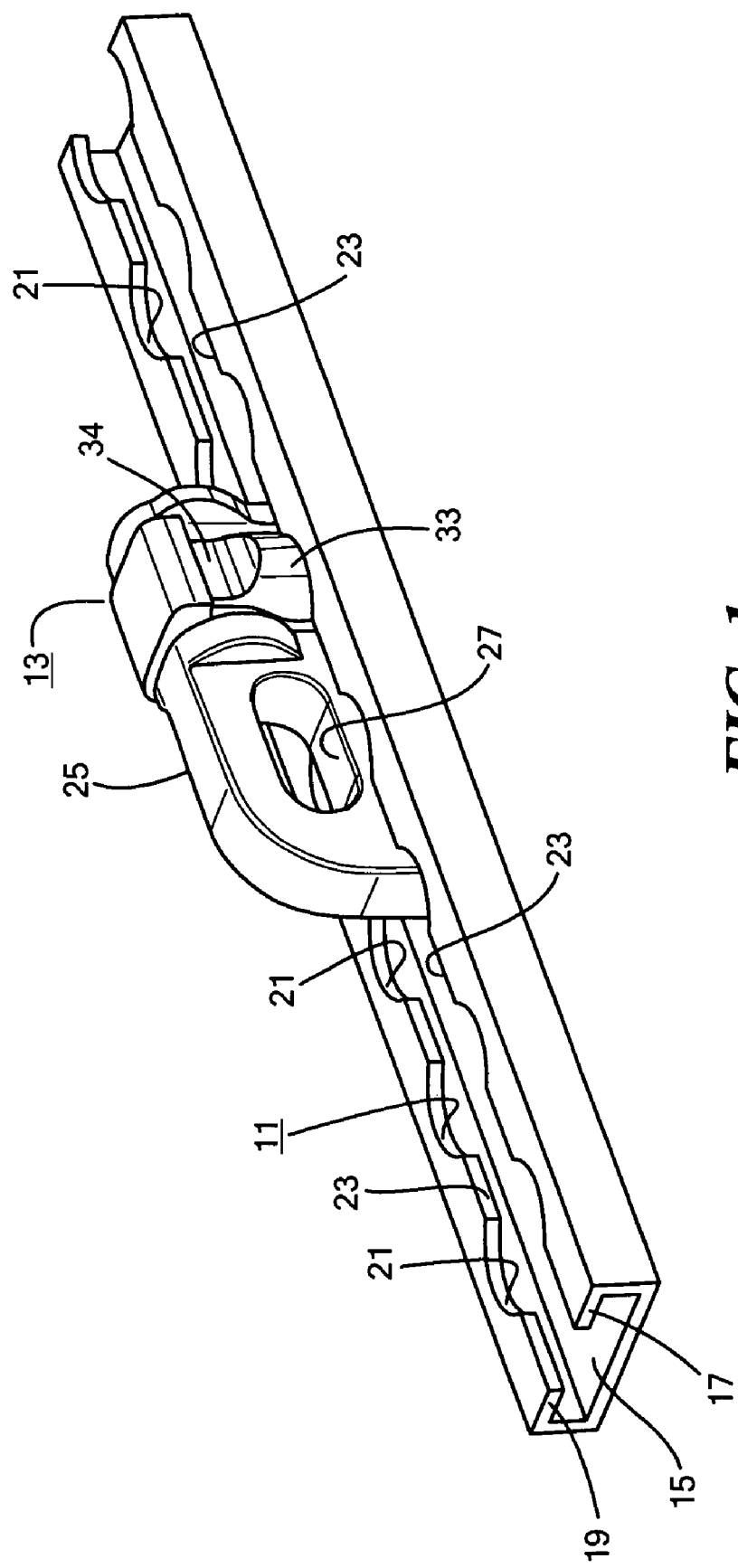
FIG. 1 is a perspective view of a tie-down anchor with which the invention may be used, the tie-down anchor being shown seated in a channel in a track of an air pallet.

Referring now to the drawings, in FIG. 1 is illustrated a track 11 and a tie-down anchor 13 seated in track 11. Track 11 may be on the periphery of an air pallet (not shown).

Track 11 includes a channel 15 having spaced upper flanges 17 and 19 which are shaped to define a series of regularly spaced apart enlarged circular openings 21 separated by relatively narrower track slot segments 23. Examples of this type of track may be found in U.S. Pat. No. 4,020,770 to McLennan et al. and U.S. Pat. No. 5,871,318 to Dixon.

Figure 2:
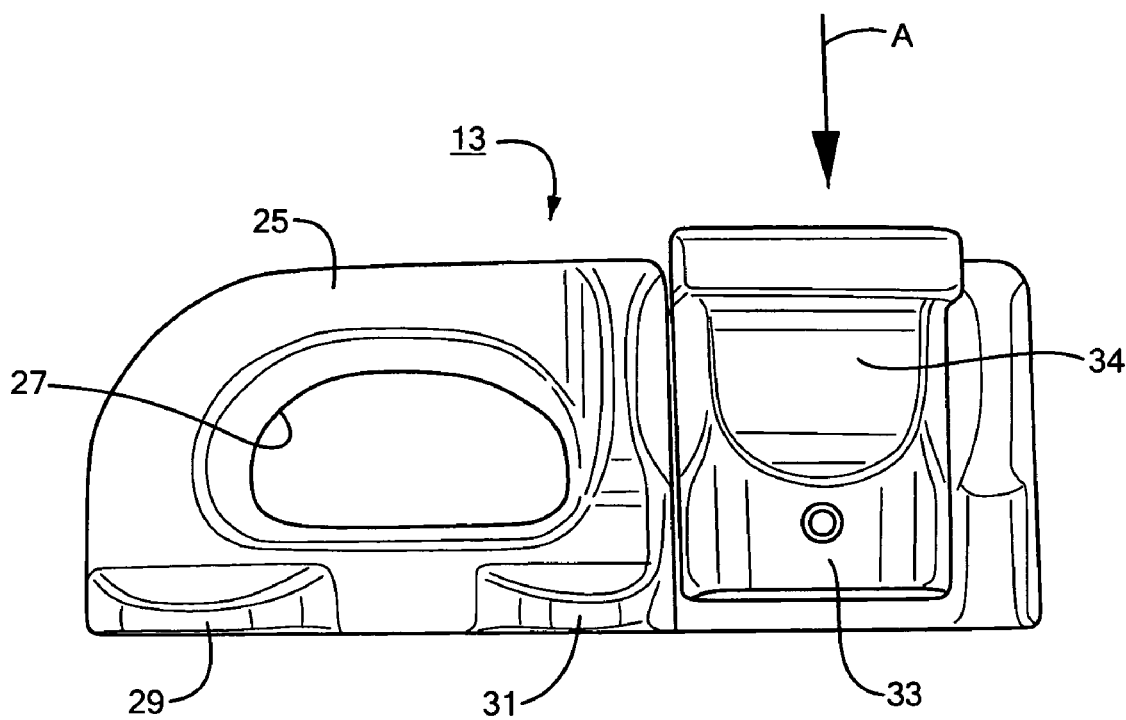
FIG. 2 is an enlarged front view of the tie-down anchor shown in FIG. 1.

Tie-down anchor 13, which is also shown in FIG. 2, is made of a sturdy metal and includes a main body portion 25 having an opening 27 through which a cable or rope or ring (not shown) may be inserted and a pair of fixed studs 29 and 31 on the bottom of main body portion 25 underneath opening 27. Tie-down anchor 13 also includes a vertically movable locking stud 33 at the bottom of a gripping member 34. Stud 33 has a spring (not shown) which biases locking stud 33 in a downward direction as shown with arrow A.

When tie-down anchor 13 is locked in channel 15 in track 11, spring loaded locking stud 33 is disposed in one of the enlarged openings 21 and studs 29 and 31 are disposed underneath a pair of track slot segments 23. When so seated, locking stud 33 prevents sliding of movement of tie-down anchor 13 along track 11 since locking stud 33 is sized larger than slot segments 23 while studs 29 and 31 prevent lifting up tie-down anchor 13 out of track 11 since studs 29 and 31 are disposed underneath slot segments 23. Accordingly, if a person wishes to move tie-down anchor 13 along track 11 to a different location, the person has to lift up locking stud 33 so that it is above flanges 17 and 19 and then slide tie-down anchor 13 along channel 15 to that other location.

It should be understood that track 11 and tie-down anchor 13 are all well known and not a part of this invention.

Figure 3:
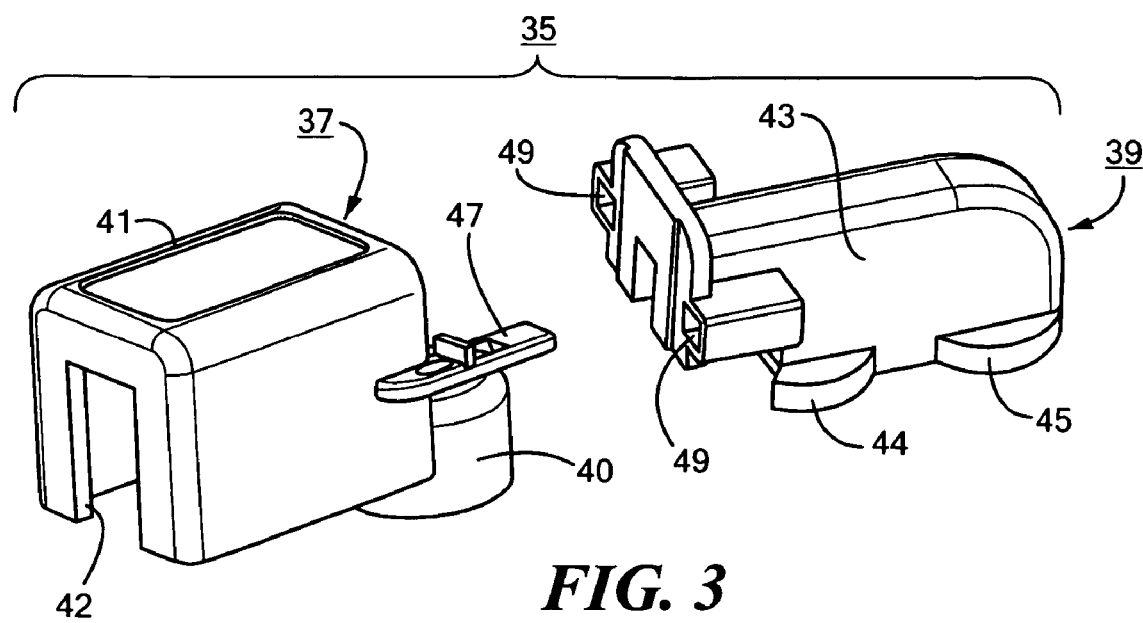
FIG. 3 is a perspective view of one embodiment of a cover according to this invention for use with the tie-down anchor as shown in FIG. 2, the cover having a first piece and a second piece and being shown in unassembled form.

In FIG. 3 is shown a cover 35 according to this invention. The purpose of cover 35 is to prevent an unauthorized person from accessing and then lifting up locking stud 33 in tie-down anchor 13 when tie-down anchor 13 is disposed in channel 15 in track 11 with studs 29 and 31 underneath flanges 17 and 19 and then sliding tie-down anchor 13 along channel 15 to another location.

Cover 35 comprises a first piece 37 and a second piece 39. Both pieces are made of a sturdy plastic. First piece 37 of cover 35 has a cylindrically shaped front portion 40 which is sized to fit into in an enlarged circular openings 21 in channel 15 and a hollow box shaped rear portion 41 closed at the top, open at the bottom and having a notch 42 at the back which is sized to fit over at least spring loaded locking stud 33 in tie-down anchor 13. Second piece 39 of cover 35 has a body 43 which includes a pair of spaced apart studs 44 and 45 sized and shaped to fit underneath a pair of slot segments 23 in channel 15.

First piece 37 of the cover also includes a pair of male locking parts 47 (see also FIG. 4) and second piece 39 of the cover includes a pair of female locking parts 49 which can mate with and snap lock into the pair of male locking parts 40 when the two pieces are pushed together. Two pieces 37 and 39 are sized relative to the size of channel 15 so that when male and female locking parts 47 and 49 are locked together studs 43 and 45 on second piece 39 are underneath a pair of slot segments 23 on the channel 15 rather than a pair of enlarged openings 21 on channel 15.

When tie-down anchor 13 is seated in channel 15 and cover 35 is mounted on tie-down anchor 15 with the locking parts 47 and 49 locked together, first piece 37 of cover 35 prevents a person from lifting up the spring-loaded locking stud 33 in order to slidably move anchor 13 along channel 15 while second piece 39 prevents a person from lifting up first piece 37 from channel 15. Once two pieces 37 and 39 are locked in place, they cannot be separated from each other without actually breaking the pairs of locking parts 47 and 49 so that they are not locked together. The locking mechanism for locking pieces 37 and 39 together is similar to the locking mechanism in Avery Dennison Corporation U.S. Pat. No. 6,640,394, in that it includes a head having an elongated channel and a locking tang within the head and a male member insertable into the head and as such the only difference being that the male member is a rigid piece of plastic rather than a flexible strap.

Figure 4:
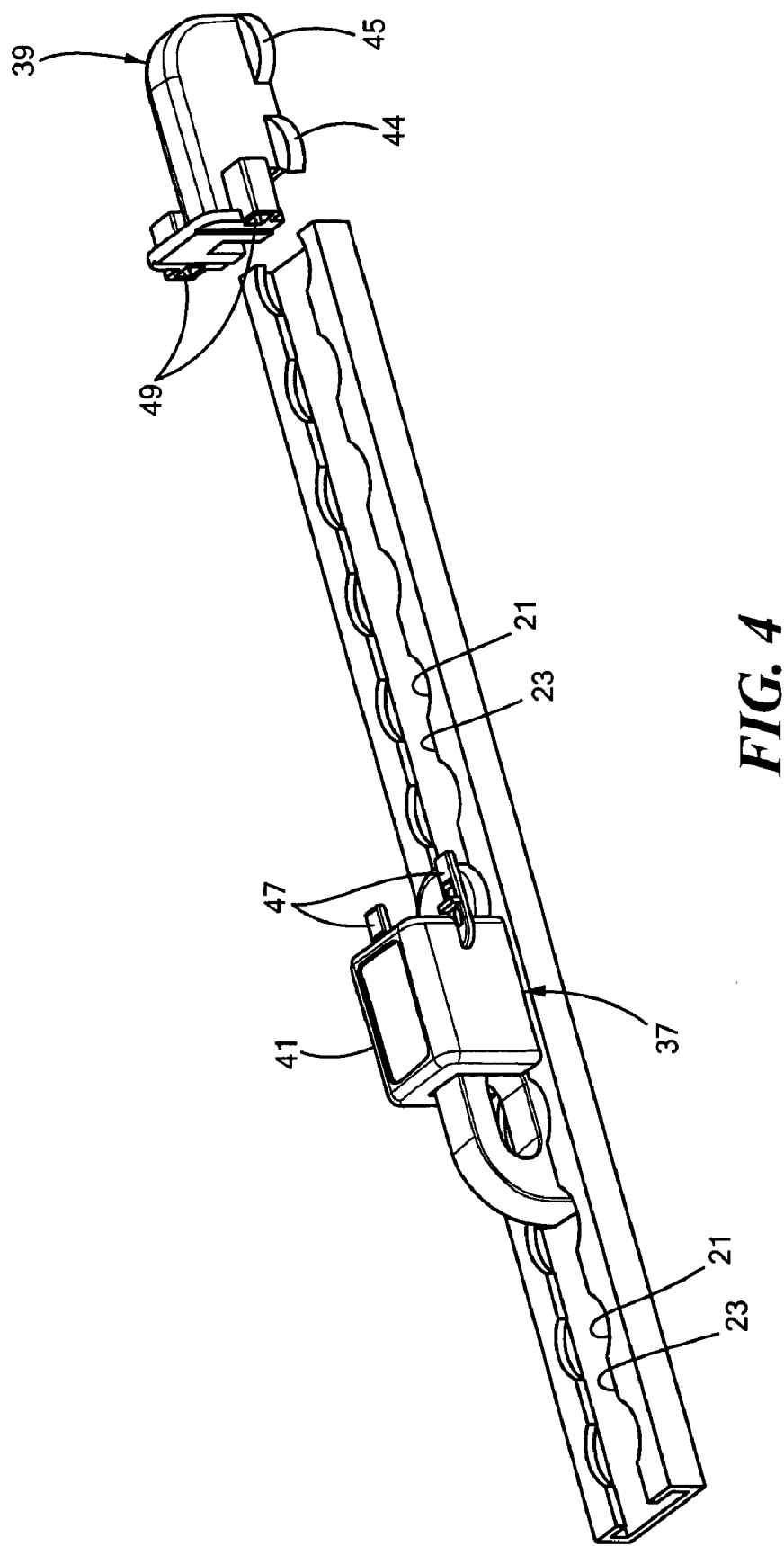
FIG. 4 is a perspective view showing the first piece of the cover shown in FIG. 3 mounted on the tie-down anchor, the tie-down anchor being seated in the track as shown in FIG. 1 and the second piece of the cover being shown next to the track.
Figure 5:
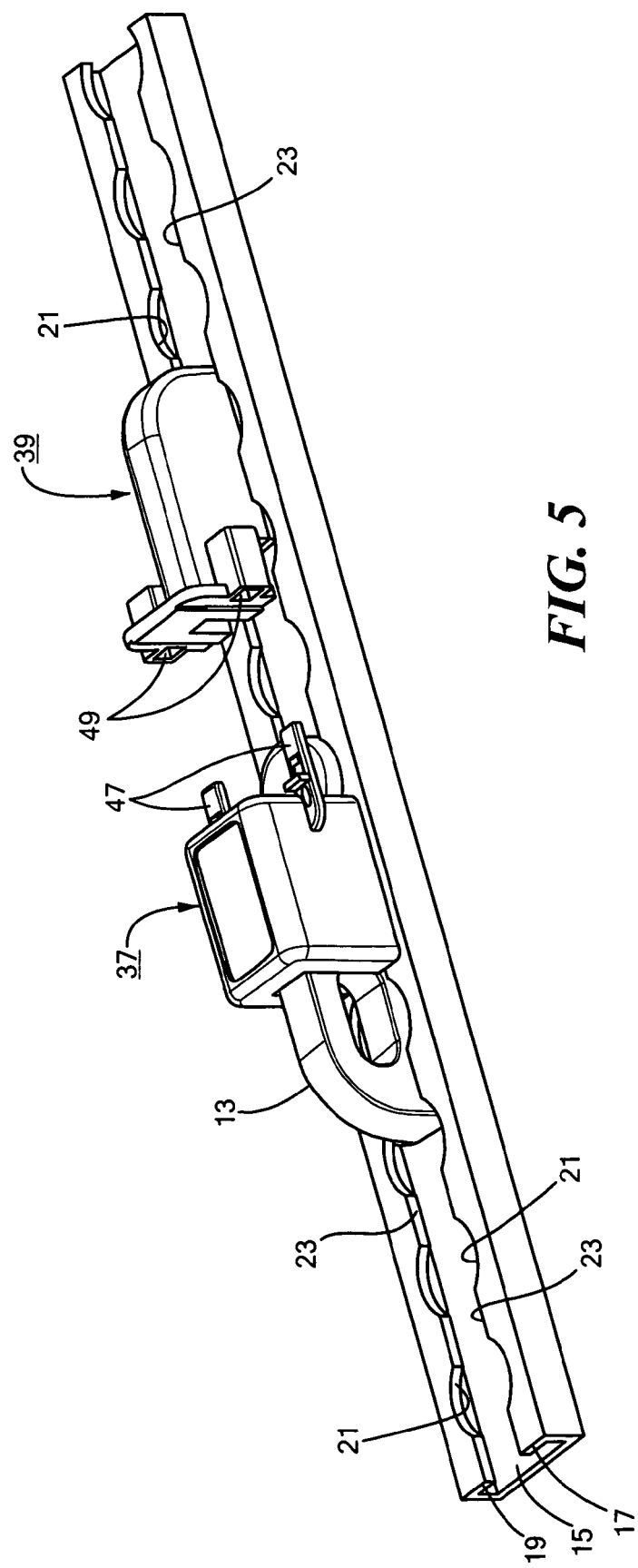
FIG. 5 is a perspective view of the first piece of the cover shown in FIG. 3 mounted on the tie down anchor as in FIG. 4 and the second piece of the cover mounted on the track but before it is coupled to the first piece.
Figure 6:
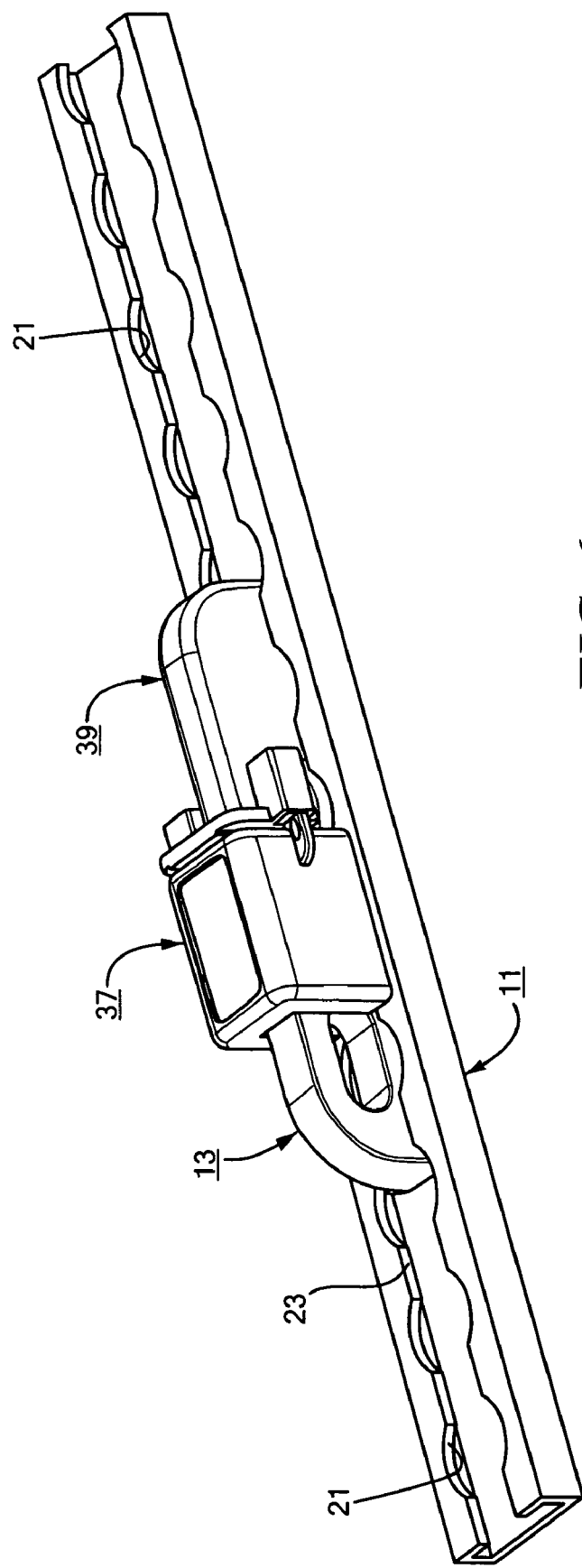
FIG. 6 is a perspective view showing the first piece of the cover shown in FIG. 3 mounted on the tie-down anchor which is mounted on the track and the second piece of the cover mounted on the track and coupled to the first piece of the cover.

Cover 35 is mounted onto tie-down anchor 13 when tie-down anchor 13 is seated on track 11 with stud 33 in an enlarged opening 21 and fixed studs 29 and 31 underneath a pair of slot segments 23 in the following manner. First, first piece 37 is mounted on tie-down anchor 13 as shown in FIG. 4. Then, second piece 39 is slid onto channel 15 as shown in FIG. 5 and pushed along channel 15 so that male locking parts 47 in first piece 37 lock into female locking parts 49 in second piece 39 as shown in FIG. 6. As can be appreciated, when first piece 37 and second piece 39 are locked together, studs 43 and 45 on second piece 39 are disposed underneath a pair of track slot segments 23 on track 11 rather than inside a pair of enlarged areas 21. Thus, first piece 37 prevents a person from accessing and lifting up locking stud 33 in order to slide tie anchor 13 along channel 15 and second piece 39 prevents a person from lifting cover 35 itself off of track 11.

Figure 7:
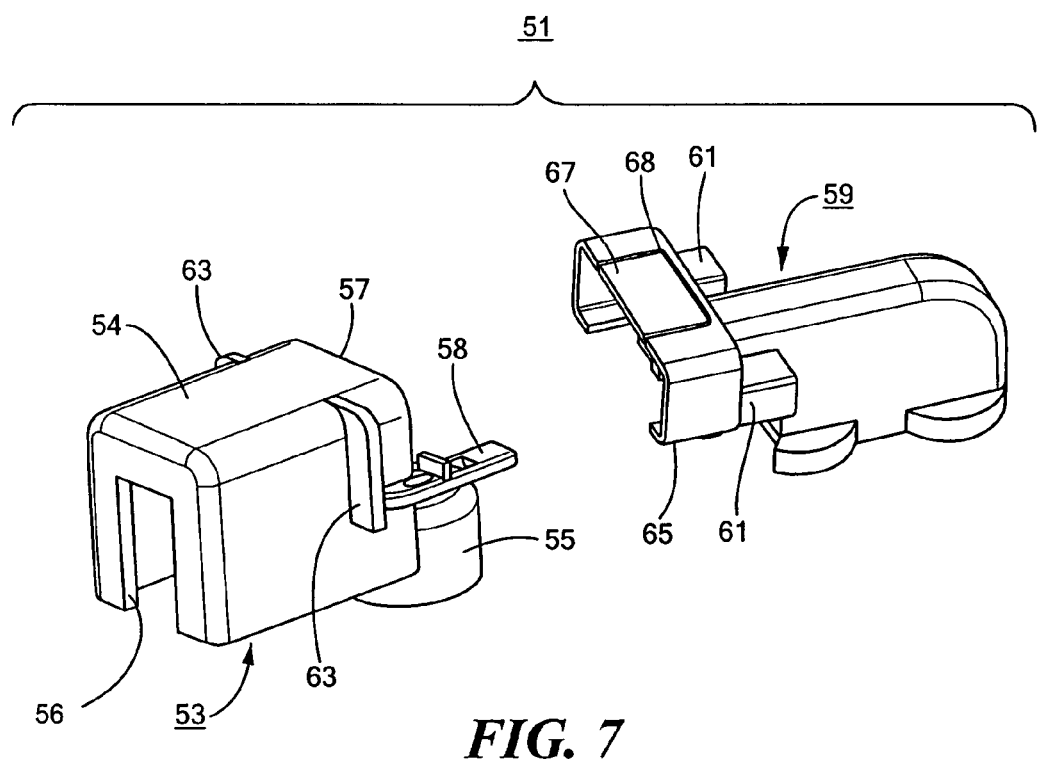
FIG. 7 is a perspective view of another embodiment of a cover according to this invention.

In FIG. 7 is shown another embodiment of a cover according to this invention and identified by reference numeral 51.

Figure 8:
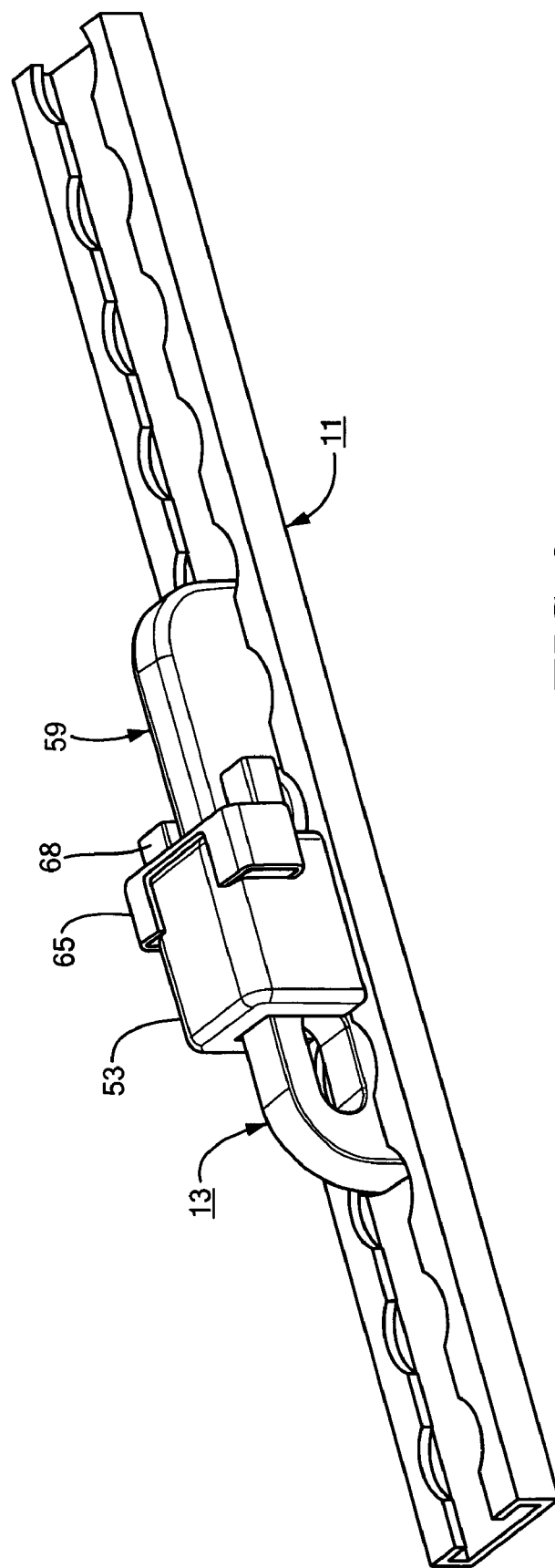
FIG. 8 is a perspective view of the cover shown in FIG. 7 mounted on the tie down anchor shown in FIG. 2 and the track shown in FIG. 1 and with the break away portion of the shroud removed.

Cover 51 is made of a sturdy plastic and is similar to cover 35 in that it includes a first piece 53 having a front portion 54 and a rear portion 55. Front portion 54 includes a notch 56 at the front and a back edge 57. Piece 53 also includes a pair of male locking parts 58. Cover 51 is similar to cover 35 in that is also includes a second piece 59 having a pair of locking female locking parts 61. The only differences between cover 35 and cover 51 is that first piece 53 includes a pair of wings 63 and second piece 59 includes a shroud 65 having a break away section 67. When first piece 53 is mounted on tie-down anchor 13 and second piece 59 is locked onto first piece 53, wings 63 will be located inside shroud 65. As can be seen, shroud 65 will prevent access to locking parts 58 and 61. The only way to separate first piece 53 from second piece 59 is to break off breakaway section 67 and then separate pieces 53 and 59 by wedging a screwdriver or other similar tool between back edge 57 of first piece 53 and edge 68 in the notch formed in shroud 65 after breakaway section 67 is removed and pushing the tool back and forth until the locking parts 58 and 61 are broken. FIG. 7 shows cover 51 with breakaway section 67 in place while FIG. 8 showing cover 51 with breakaway section 67 removed. As can be appreciated, it will be readily apparent if breakaway section 67 has been removed.

Figure 9:
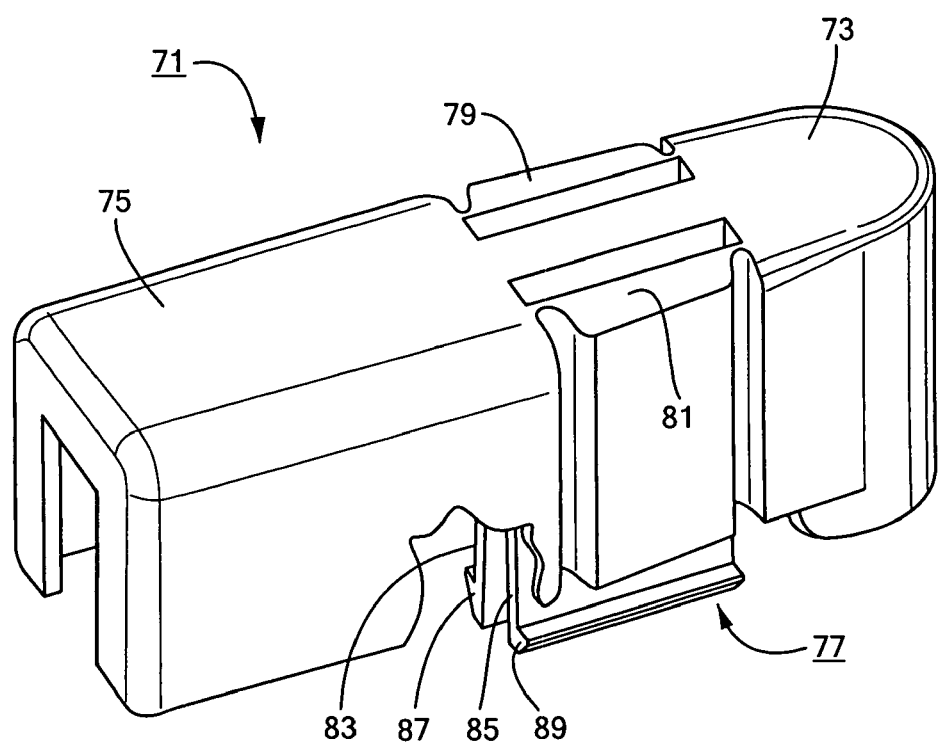
FIG. 9 is a perspective view taken from the front and partly broken away of another embodiment of a cover according to this invention.
Figure 11:
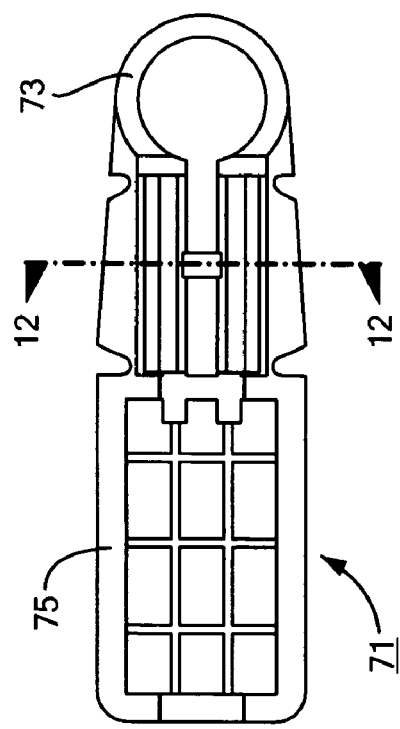
FIG. 11 is a bottom view of the cover shown in FIG. 9.
Figure 12:
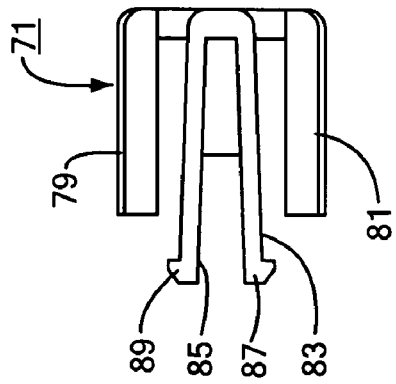
FIG. 12 is a section view taken along lines 12-12 in FIG. 11.
Figure 10:
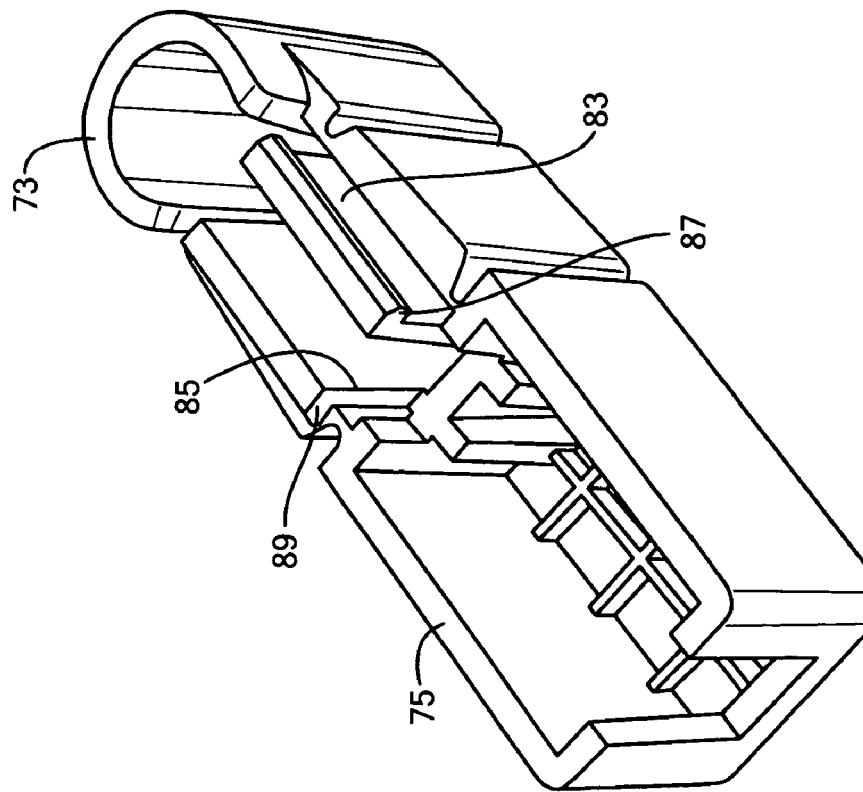
FIG. 10 is a perspective view taken from the bottom of the cover shown in FIG. 9.
Figure 13:
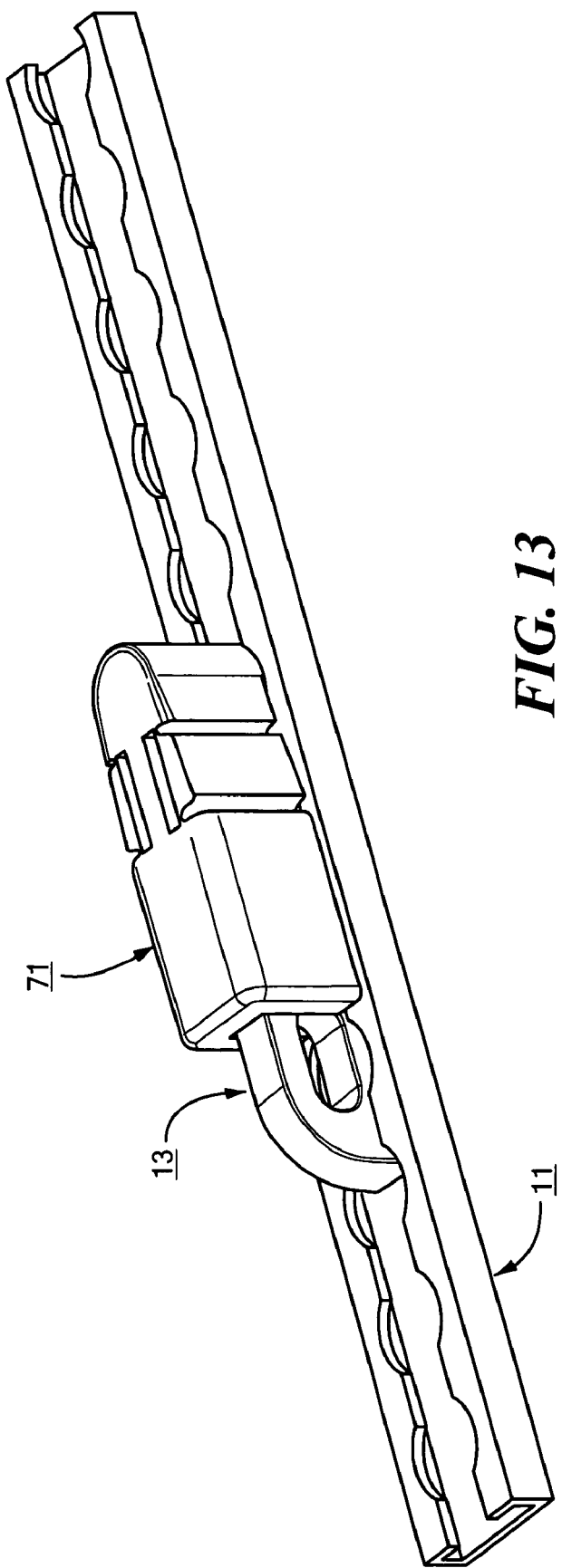
FIG. 13 is a perspective view showing the cover in FIG. 9 mounted on the tie-down anchor in FIG. 2 which is mounted on the track shown in FIG. 1.

In FIG. 9 is shown another embodiment of a cover according to this invention and identified by reference numeral 71.

Cover 71 is made of a sturdy plastic and differs from cover 35 and cover 51 in that it is a unitary structure rather than two pieces which can be locked together.

Cover 71 includes a front portion 73 sized and shaped to be removably mounted in one of the enlarged openings 21 in channel 15 in track 11, a rear portion 75 sized and to fit over at least a portion of the spring loaded locking stud 31 in anchor 13 and an intermediate portion 77 between front portion 73 and rear portion 75. Intermediate portion 77 includes a pair of outer legs 79 and 81 on either side of a pair of flexible inner legs 83 and 85. Feet 87 and 89 are formed at the bottom of legs 83 and 85, respectively. Outer legs 79 and 81 are not connected to inner legs 83 and 85.

Cover 71 is mounted onto anchor 13 and track 11 when anchor 13 is on track 11 as shown in FIG. 1 by positioning cover 71 over anchor 13 and track 11 and then pushing cover 71 down onto anchor 13 and track 11 until inner legs 83 and 85 flex inward and feet 87 and 89 snap lock into channel 15 underneath a pair of slot segments 23.

Once snap-locked into track 11, the only way that cover 71 can be removed is to break off outer legs 79 and 81 and then squeeze together inner legs 81 and 83 so that feet 87 and 89 are not snap locked underneath a pair of slot segments 23 and then pull legs 81 and 83 up through slot segments 23 can be pulled up through slot 23. Inner legs 83 and 85 cannot be grasped and squeezed together without first breaking off outer legs 79 and 81.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A cover for use with a tie-down anchor adapted to be mounted in a locking track in an air pallet, the locking track having a channel which includes spaced upper flanges shaped to define a series of enlarged circular openings separated by relatively narrower slot segments, the tie-down anchor having a pair of fixed locking studs and a vertically movable spring loaded locking stud, the cover comprising:

(a) a first piece having a front portion sized and shaped to fit into one of the enlarged circular openings in the locking track and a rear portion sized and shaped to fit at the same time over the spring loaded locking stud, said rear portion having a pair of locking parts, and (b) a second piece having a pair of studs sized and shaped to fit into a pair of enlarged openings in the locking track and having a pair of locking parts matable with the locking parts in the first piece, (c) the studs in the tie-down anchor being sized and shaped to fit into the enlarged circular openings in the locking track but not be movable vertically up through the slot segments in the channel, (d) the studs in the second piece being sized and shaped so that they can slide along the channel but cannot move vertically up through the slot segments in the channel, (e) wherein, when the first piece is mounted on the tie-down anchor over the spring loaded locking stud and the second piece is mounted on the locking track and the locking parts are locked together, the first piece prevents access to the spring loaded stud and the second piece prevents lifting up the first piece.

2. A cover for use with a tie-down anchor adapted to be mounted in a locking track in an air pallet, the locking track having a channel which includes spaced upper flanges shaped to define a series of enlarged circular openings separated by relatively narrower slot segments, the tie-down anchor having a pair of fixed locking studs and a movable spring loaded locking stud, the cover comprising:
  (a) a first piece having a front portion sized and shaped to fit into an enlarged circular opening in the locking track and a rear portion sized and shaped to fit over the spring loaded locking stud, said rear portion having a pair of locking parts, and
  (b) a second piece having a pair of studs sized and shaped to fit into a pair of enlarged circular openings in the locking track and having a pair of locking parts matable with the locking parts in the first piece,
  (c) wherein, when the first piece is mounted on the tie-down anchor over the spring loaded locking stud and the second piece is mounted on the locking track and the locking parts are coupled together, the first piece prevents access to the spring loaded stud and the second piece prevents lifting up the first piece.

3. A cover for use with a tie-down anchor adapted to be mounted in a locking track in an air pallet, the locking track having a channel which includes spaced upper flanges shaped to define a series of pairs of enlarged circular opening separated relatively narrower slot segments, the tie-down anchor having a pair of fixed locking studs and a movable spring loaded locking stud, the cover comprising:
  (a) a first piece sized and shaped to fit an enlarged circular opening in the locking track and at the same time over the spring loaded locking stud,
  (b) a second piece having a pair of studs sized and shaped to fit under a pair of slot segments in the locking track,
  (c) means on the first piece and the second pieces for locking the first and second pieces together,
  (d) wherein, when the first piece is mounted on the tie-down anchor over the spring loaded locking stud, the second piece is mounted on the locking track and the two pieces are locked together, the first piece prevents access to the spring loaded stud and the second piece prevents lifting up the first piece.

4. A cover for use with a tie-down anchor adapted to be mounted in a locking track in an air pallet, the locking track having a channel which includes spaced upper flanges shaped to define a series of pairs of enlarged circular openings separated by a series of narrower slot segments, the tie-down anchor having a pair of fixed locking studs and a movable spring loaded locking stud, the cover comprising:
  (a) a first piece sized and shaped to fit into an enlarged circular opening in the locking track and fit over the spring loaded locking stud,
  (b) a second piece having a pair of studs sized and shaped to fit underneath a pair of slot segments in the locking track;
  (c) means on the first piece and the second piece for locking the first and second pieces together, and
  (d) means for preventing access to the locking means,
  (e) wherein, when the first piece is mounted on the tie-down anchor over the spring loaded locking stud, the second piece is mounted on the locking track and the two pieces are locked together, the first piece prevents access to the spring loaded stud and the second piece prevents lifting up the first piece.

* * * * *